(12) United States Patent
Peikari

(10) Patent No.: US 7,512,809 B2
(45) Date of Patent: Mar. 31, 2009

(54) ATTENUATED COMPUTER VIRUS VACCINE

(75) Inventor: Cyrus Peikari, 3241 Purdue Ave., Dallas, TX (US) 75225

(73) Assignee: Cyrus Peikari, Dallas, TX (US)

( * ) Notice: Subject to any disclaimer, the term of this patent is extended or adjusted under 35 U.S.C. 154(b) by 1056 days.

(21) Appl. No.: 10/923,434

(22) Filed: Aug. 21, 2004

(65) Prior Publication Data

US 2005/0204150 A1    Sep. 15, 2005

(51) Int. Cl.
*G06F 9/00* (2006.01)

(52) U.S. Cl. ............... 713/188; 713/189; 713/194; 713/165; 713/166

(58) Field of Classification Search ............ 713/188, 713/189, 194, 165, 166
See application file for complete search history.

(56) References Cited

U.S. PATENT DOCUMENTS 5,440,723 A * 8/1995 Arnold et al. .............. 714/2
6,347,375 B1 * 2/2002 Reinert et al. ............. 726/24
6,947,986 B1 * 9/2005 Huang et al. .............. 709/225
7,010,807 B1 * 3/2006 Yanovsky ................. 726/24

* cited by examiner

*Primary Examiner*—Thomas R Peeso

(57) ABSTRACT

A method and apparatus optimizes the protection of computing networks. This protection utilizes attenuated (weakened) strains of live, replicating, malicious code such as viruses and worms, analogous to the development of live, attenuated, human vaccines in the medical field. In a preferred embodiment, this is achieved by (1) attenuating a malicious program, e.g. a virus or worm, or software vulnerability by limiting its virulence, i.e., limiting its damage and resource usage, (2) modifying the virus to confer immunity on the network that it infects, e.g., automatically patching a vulnerability, or marking the infected host as immune to further infection, (3) releasing the newly attenuated virus into the network, (4) tracking the attenuated virus and its success rate (e.g., rate and ratio of successfully patched to un-patched vulnerable hosts), and (5) limiting the spread of the virus vaccine, e.g., emergency termination, timeout to die, "white-list" of hosts not to touch, network IP address limitation, restricted IP ranges, variable address selection algorithm.

19 Claims, 1 Drawing Sheet

ATTENUATED COMPUTER VIRUS VACCINE

CROSS-REFERENCE TO RELATED APPLICATIONS

Not Applicable

STATEMENT REGARDING FEDERALLY SPONSORED RESEARCH OR DEVELOPMENT

Not Applicable

FIELD OF THE INVENTION

The invention relates to the field of computer viruses. In particular, the invention is directed to improving the anti-virus capability and the stability and security of computer networks by strengthening them with attenuated (weakened) forms of malicious or replicating software.

BACKGROUND OF THE INVENTION

In human medicine, a vaccine is often made with a weakened or killed pathogen, such as a bacterium or virus, or of a portion of the pathogen's structure that upon administration stimulates antibody production or cellular immunity against the pathogen, but is rarely incapable of causing severe infection. However, the prior art has never applied this concept of administering a pathogen to computer systems for the purpose of enhancing immunity.

In computing systems, the most common method for detecting computer problems such as viruses or corrupted files is by "signature scanning". This method involves searching files in a computer system for data signatures that are unique to the target. For example, a virus may be identified by a particular string of data. A typical virus scanner operates by loading a set of virus data signatures into memory and then sequentially scanning the host system files for the presence of these data signatures.

However, the number of computer viruses is continually growing. There are currently over 50,000 known computer viruses. As a result, prior art in virus diagnosis and treatment is becoming overwhelmed. For example, scanning a typical system with 20,000 files for a data set of 50,000 virus signatures involves a total of one billion file searches. The prior art techniques are thus becoming more time consuming, resource consuming, and costly. Thus, there is a pressing need for new and more efficient ways to protect against computer viruses. In addition, infection by fast-spreading computer "worms", or self-spreading viruses, often overwhelms human speed and defeats the ability of automatic software to counter them in the prior art.

Newer diagnostic systems for viruses have emerged using the concept of digital immune systems. In such a method, the computing system is designed to react like a human immune system by detecting known or unknown viral signatures and by automatically generating a "vaccine." However, this is not a true "vaccine." In the prior art there is no attempt to use the virulent aspect of the pathogen itself to strengthen the host. Also, there has never been an attempt to immunize a network by infecting it with truly hostile (i.e., not merely self-replicating) code. Thus, the prior art has never utilized the strength of a hostile computer virus in order to strengthen and to stabilize a network.

As explained above, prior art diagnostic systems are limited to reactive methods such as virus scanning or limited attempts at an encapsulated digital immune system. Thus, the prior art has several limitations. It is widely acknowledged that current antivirus solutions are inadequate. Although software to protect against computer viruses is in widespread use, each year viruses cause between $10-20 billion in damage worldwide. The average business currently spends $81,000 to clean up after each virus outbreak. The Code Red virus itself is estimated to have cost $2.5 billion worldwide. In fact, Code Red still exists in the wild nearly two years after it was first released, and some researchers have shown that the Internet might remain infected with it indefinitely.

In addition, the growing threat from wireless devices could amplify the danger. For example, viruses that infect wireless devices already exist. Moreover, hundreds of millions of "smart" wireless phones (Smartphones)—phones with sophisticated software—will soon be potential victims. For example, Microsoft Corporation reported that it is "only a matter of time" before their Windows Mobile Smartphone platform is attacked by viruses.

The explosion of hundreds of millions of such "smart" handheld devices as personal data assistants (PDAs) and smartphones pose a double risk. On the one hand, these mobile devices generally lack effective anti-virus software and have little or no security architecture. On the other hand, they often incorporate multiple communication protocols and methods for data transfer, which can increase the number of virus vectors. Each one of these data transfer mechanisms can increase the opportunity for viruses to spread.

BRIEF SUMMARY OF THE INVENTION

The present invention overcomes the disadvantages of the prior art, by offering the following:

A method and apparatus for creating an attenuated computer virus vaccine. This vaccine is prepared from a live, replicating virus in the wild, or from a software vulnerability that might be expected to become the basis of a future worm or virus. For example, when the Melissa virus infected a computer, it conferred future immunity to the target system by marking the target computer as "infected." The infected computer was thus resistant to future infection. However, the damage from Melissa was from increased bandwidth consumption. After infecting a computer, Melissa it sent emails to 50 people from the newly infected computer's address book. To make a "vaccine" based on the Melissa virus, it is possible to alter the source code to slow the rate of infection by adding a time delay. It is also possible to slow the infection by decreasing the number of vectors from 50 emails down to, for example, five. Thus, your new, attenuated "vaccine" is still a live, replicating version of Melissa. However, it confers immunity while causing much less damage in terms of bandwidth consumption, because it spreads more slowly that the full strength virus. This is analogous to attenuated, human vaccines in the medical field.

A method and apparatus for strengthening the anti-virus capabilities, the diagnostic and therapeutic power, the stability, and the security of a single computer, a computer network, a group of networks, a mesh network, or the entire global Internet, by proactively infecting the target machine or network with a weakened or killed pathogen, i.e., a computer vaccine, such as an attenuated computer virus or other hostile or replicating code. This improves the efficiency of the anti-virus process by bolstering the target network's defenses, or by conferring immunity, typically without causing severe infection. For example, the software vulnerability that permitted the Code Red virus infection was known weeks before the actual virus was created and released. This "lag time" is common with software vulnerability reporting. It would be possible to proactively release an attenuated form of Code Red, for example, in the lag time before the actual virus was created and released. The attenuated virus would confer immunity by automatically spreading across networks and patching the known exploit, weeks before the real virus hit. This could save millions, and perhaps billions, of dollars in damage. This is also analogous to the principle of biological immunization in the field of medicine.

DETAILED DESCRIPTION OF THE INVENTION

Figure 1:
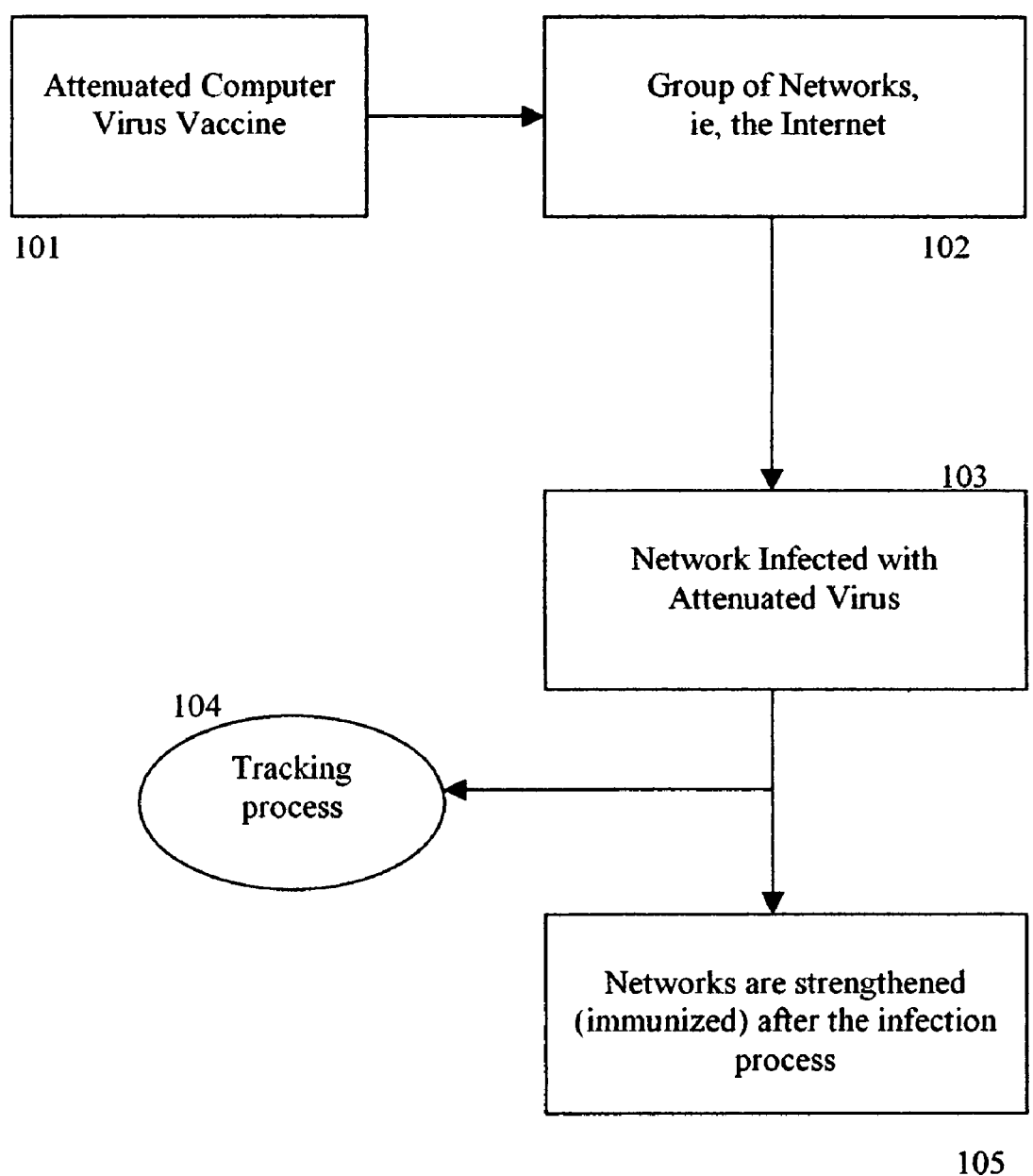
FIG. 1 illustrates a sample network that utilizes the present invention.

The present invention may be understood more clearly from the following description, which is solely for explanation and should not be taken to limit the invention to any specific form thereof, taken together with the accompanying drawing.

FIG. 1 describes the immunization process. The attenuated virus (101) is released into a system of Networks such as the Internet (102). The networks thus become infected with the attenuated form of the virus (103). As it spreads, the virus sends tracking and effectiveness information back to a data collection center (104). After the infection process, the target networks are now strengthened, either by automatic software vulnerability patching, or by marking them as immune to further infection (105).

As shown in FIG. 1, the attenuated computer virus vaccine is created at step 101. Like human vaccines in the medical field, our vaccines are prepared from actual live, replicating malicious viruses found in the wild. Alternately, we can create a similar, self-replicating piece of code to automatically patch known software vulnerabilities. Although our vaccine is based on live, self-replicating malicious code, it has been attenuated to cause less damage than the full-strength virus itself. This confers a twofold advantage over the prior art. On the one hand, the vaccine uses the viral power of self-replication to spread itself with maximum speed and penetration. This self-replication allows the vaccine to achieve its effect much faster than any form of manual or automated patching known in the prior art. On the other hand, the vaccine is attenuated (weakened). Thus, it causes much less damage than the virus that invariably results after the public announcement of widespread software vulnerability. In other words, our vaccine preemptively spreads protection to a maximum number of target machines, with a minimum amount of damage. This pre-emptive immunization can result in an enormous cost savings over the prior art, which to date has only been able to react passively, often after millions or billions of dollars in damage have occurred.

For example, the vulnerability that led to the Code Red virus was publicly known weeks before a virus was created that exploited it. Many experts knew it was only a matter of time before a virus like Code Red would appear, and sure enough, it did appear after a few weeks of "lag time"—resulting in billions of dollars in damage to global computer networks. Using the present invention, much of the billions of dollars in damage could have been avoided. In the lag time, it would have been possible to release an attenuated form or Code Red, either modified from a previous version of the malicious code, or else written from scratch to closely resemble it. The modified Code Red vaccine would be attenuated to spread more slowly, thus avoiding most of the disruption and damage that the full strength virus would subsequently cause. This modified Code Red could also flag infected systems as immune from further infection. It could also automatically patch vulnerable systems, thus protecting them from further infection. Thus, the present invention is a significant breakthrough in technology. It is an intuitive leap from prior art, inspired by human vaccines that are based on attenuated strains of live, human pathogens. It is also an intuitive leap because in the prior art, malicious viruses have been viewed as destructive, rather than beneficial.

At step 102, the target network for the vaccine is selected. For example, the attenuated virus vaccine can be released into the global Internet by an international computer networking standards body (analogous to the World Health Organization in the field of medicine). The target network can also be much smaller, such as a single nation's military releasing the vaccine into their .mil (military) domain in order to vaccinate their machines. Or, the target network could be a single company's internal network address range. There are also several ways to restrict the vaccine spread if desired. For example, the attenuated virus vaccine could be programmed with a timeout to die or an emergency termination signal. It could also be restricted with a "white-list" of hosts not to touch or by using a variable address selection algorithm.

Once the attenuated virus vaccine infects the target network at step 103, it performs its vaccination. For example, the virus could mark infected hosts as "immune", in order to protect them from further infection with more virulent strains to come. Similarly, the vaccine could automatically patch known software vulnerabilities, thus rendering the target system immune from further attacks.

During the spread of the attenuated virus vaccine in the wild, optional reporting features of the vaccine track and report its spread at step 104. This tracking feature allows researchers to learn more about the efficacy of the vaccine's penetrance into the target population of network and machines, such as by measuring the total number of immunized hosts. In addition, it allows researchers to track the efficacy of the vaccine. For example, the vaccine could report the ratio of successful to unsuccessful vaccine attempts on a target machine or network.

Following infection with the attenuated virus vaccine, the target network is immunized from further infection. Thus, when future, more virulent strains of the virus are released in the wild, the target networks have been greatly strengthened against re-infection. Because the attenuated virus vaccine spreads slowly and with less consumption of resources, there can be a significant cost savings by proactively releasing the vaccine, rather than trying to clean up reactively after a new virus hits. For example, an attenuated virus vaccine released in the lag time between Code Red variants could have saved the Internet from severe infection and might have saved hundreds of millions of dollars in damage and subsequent cleanup costs.

The invention claimed is:

1. An apparatus configured to protect a computing network, said network comprising at least one computing device, said apparatus for limiting vulnerability to malicious software by attenuating its virulence comprising:
   a. means for modifying the virus to confer immunity on the network that it infects,
   b. means for releasing the newly attenuated virus into the network,
   c. means for tracking the attenuated virus and its success rate, and
   d. means for optionally limiting the spread of the virus vaccine.

2. A method to protect a computing network, said network comprising at least one computing device for attenuating a malicious program or software vulnerability by limiting its virulence comprising:
   a. modifying the virus to confer immunity on the network that it infects,
   b. releasing the newly attenuated virus into the network,
   c. tracking the attenuated virus and its success rate,
   d. providing an optional limiting of the spread of the virus vaccine.

3. The method of claim 2, further comprises multiple processes for protecting computing networks.

4. The method of claim 2, wherein said method further comprises attenuating a malicious program or software vulnerability by limiting the damage that it causes.

5. The method of claim 2, wherein said method further comprises attenuating a malicious program or software vulnerability by limiting its network resource consumption such as rate of spread.

6. The method of claim 2, wherein step (a) further comprises modifying the virus to confer immunity on the network that it infects by automatically patching a known software vulnerability.

7. The method of claim 2, wherein step (a) further comprises modifying the virus to confer immunity on the network that it infects by marking infected systems as "immune" from future infections by similar viruses.

8. The method of claim 2, wherein said method further comprises releasing the newly attenuated virus into the network from multiple locations.

9. The method of claim 2, wherein step (c) further comprises tracking the attenuated virus and its success rate by measuring and utilizing the rate and ratio of successfully patched to un-patched vulnerable hosts.

10. The method of claim 2, wherein step (d) further comprises limiting the spread of the virus vaccine with an emergency termination signal.

11. The method of claim 2, wherein step (d) further comprises limiting the spread of the virus vaccine by including a timeout to die.

12. The method of claim 2, wherein step (d) further comprises limiting the spread of the virus vaccine by including a "white-list" of hosts not to touch.

13. The method of claim 2, wherein step (d) further comprises limiting the spread of the virus vaccine by including restricted IP ranges.

14. The method of claim 2, wherein step (d) further comprises limiting the spread of the virus vaccine by including variable address selection algorithms.

15. A method for protecting computing networks using attenuated strains of malicious code, comprising the steps of:
   a. Attenuating a malicious program or software vulnerability by limiting its virulence,
   b. modifying the virus to confer immunity on the network that it infects,
   c. releasing the newly attenuated virus into the network,
   d. tracking the attenuated virus and its success rate, and
   e. providing an option to limit the spread of the virus vaccine.

16. The method of claim 15, wherein the step of protecting networks is accomplished using self-replicating, malicious code.

17. The method of claim 15, wherein the step of protecting networks is accomplished using attenuated forms of self-replicating, malicious code.

18. The method of claim 15, further comprising releasing the attenuated virus vaccine on a single machine.

19. The method of claim 15, further comprising releasing the attenuated virus vaccine on a network or group of networks such as a mesh network or the Internet.

* * * * *